US006874105B2

(12) United States Patent
Buechner et al.

(10) Patent No.: US 6,874,105 B2
(45) Date of Patent: Mar. 29, 2005

(54) OPERATION GRAPH BASED EVENT MONITORING SYSTEM

(75) Inventors: Thomas Buechner, Weil im Schoenbuch (DE); Rolf Fritz, Waldenbuch (DE); Markus Michael Helms, Boeblingen (DE); Kirk David Lamb, Kingston, NY (US); Thomas Schlipf, Holzgerlingen (DE); Manfred H. Walz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 09/997,048

(22) Filed: Nov. 29, 2001

(65) Prior Publication Data

US 2002/0100025 A1 Jul. 25, 2002

Related U.S. Application Data

(63) Continuation-in-part of application No. 09/238,293, filed on Jan. 28, 1999.

(30) Foreign Application Priority Data

Oct. 30, 1998 (DE) .......................................... 98 120 705

(51) Int. Cl.[7] ................................................ G06F 11/00
(52) U.S. Cl. ............................. 714/39; 714/37; 714/45; 717/133
(58) Field of Search ............................... 714/33, 34, 36, 714/37, 39, 45, 46; 717/133, 156

(56) References Cited

U.S. PATENT DOCUMENTS 5,355,484 A    10/1994   Record et al.

*Primary Examiner*—Nadeem Iqbal
*Assistant Examiner*—Timothy M. Bonura
(74) *Attorney, Agent, or Firm*—Scully, Scott, Murphy & Presser; Gail H. Zarick, Esq.

(57) ABSTRACT

A non-obtrusive activity monitor is proposed for advantageously monitoring and tracing disjunct, concurrent computer system operations in heavily queued computer systems. For each traced and pending computer system operation, the monitor uses a hardware implementation of an event triggered operation graph to trace the path of the computer system operation through the computer system. For each followed path, a unique signature is generated that significantly reduces the amount of trace data to be stored. In a preferred embodiment, the trace information is stored together with a time stamp for debugging and measuring queuing effects and timing behavior in a computer system.

20 Claims, 9 Drawing Sheets

| seq # | error type | MISR value | state sequence |
|---|---|---|---|
| 0 |  | 275 | SPLC IDLE |
| 1 | type1 | 235 | SPLC ERR1 |
| 2 |  | 1DA | SPLC SNSC IDLE |
| 3 | type2 | 035 | SPLC SNSC |
| 4 | type1 | 19A | SPLC SNSC ERR1 |
| 5 |  | 1A0 | SPLC SNSC UPDT IDLE |
| 6 | type2 | 0DA | SPLC SNSC UPDT |
| 7 | type1 | 1ED | SPLC SNSC UPDT ERR1 |
| 8 |  | 31A | SPLC DCHK IDLE |
| 9 | type2 | 1B5 | SPLC DCHK |
| 10 | type1 | 35A | SPLC DCHK ERR1 |
| 11 |  | 08D | SPLC DCHK CBSY IDLE |
| 12 | type2 | 29A | SPLC DCHK CBSY |
| 13 | type1 | 0CD | SPLC DCHK CBSY ERR1 |
| 14 |  | 046 | SPLC DCHK CBSY CCHK IDLE |
| 15 | type2 | 30D | SPLC DCHK CBSY CCHK |
| 16 | type1 | 006 | SPLC DCHK CBSY CCHK ERR1 |
| 17 |  | 1A3 | SPLC DCHK CBSY CCHK CMDT IDLE |
| 18 | type2 | 0C6 | SPLC DCHK CBSY CCHK CMDT |
| 19 | type1 | 1E3 | SPLC DCHK CBSY CCHK CMDT ERR1 |
| 20 |  | 3B1 | SPLC DCHK CBSY CCHK CMDT REQS IDLE |
| 21 | type2 | 0E3 | SPLC DCHK CBSY CCHK CMDT REQS |
| 22 | type1 | 3F1 | SPLC DCHK CBSY CCHK CMDT REQS ERR1 |
| 23 |  | 178 | SPLC DCHK CBSY CCHK CMDT REQS RQL2 IDLE |
| 24 | type2 | 171 | SPLC DCHK CBSY CCHK CMDT REQS RQL2 |
| 25 |  | 2FC | SPLC DCHK CBSY CCHK CMDT REQS RQL2 L2GR IDLE |
| 26 | type2 | 278 | SPLC DCHK CBSY CCHK CMDT REQS RQL2 L2GR |
| 27 | type1 | 2BC | SPLC DCHK CBSY CCHK CMDT REQS RQL2 L2GR ERR1 |
| 28 |  | 25E | SPLC DCHK CBSY CCHK CMDT REQS RQL2 L2GR L2CX IDLE |
| 29 | type2 | 33C | SPLC DCHK CBSY CCHK CMDT REQS RQL2 L2GR L2CX |
| 30 |  | 1AF | SPLC DCHK CBSY CCHK CMDT REQS RQL2 L2GR L2CX L2DX IDLE |
| 31 | type2 | 0DE | SPLC DCHK CBSY CCHK CMDT REQS RQL2 L2GR L2CX L2DX |
| 32 | type1 | 1EF | SPLC DCHK CBSY CCHK CMDT REQS RQL2 L2GR L2CX L2DX ERR1 |
| 33 | type1 | 21E | SPLC DCHK CBSY CCHK CMDT REQS RQL2 L2GR L2CX ERR1 |
| 34 |  | 3FE | SPLC DCHK CBSY CCHK CMDT REQS RQL2 L2GR L2DX IDLE |
| 35 | type2 | 07C | SPLC DCHK CBSY CCHK CMDT REQS RQL2 L2GR L2DX |
| 36 | type1 | 3BE | SPLC DCHK CBSY CCHK CMDT REQS RQL2 L2GR L2DX ERR1 |
| 37 | type1 | 138 | SPLC DCHK CBSY CCHK CMDT REQS RQL2 ERR1 |
| 38 |  | 071 | SPLC DCHK CBSY CCHK CMDT RQL2 IDLE |
| 39 | type2 | 363 | SPLC DCHK CBSY CCHK CMDT RQL2 |
| 40 |  | 078 | SPLC DCHK CBSY CCHK CMDT RQL2 L2GR IDLE |
| 41 | type2 | 371 | SPLC DCHK CBSY CCHK CMDT RQL2 L2GR |

FIG. 7A

| seq # | error type | MISR value | state sequence |
|---|---|---|---|
| 42 | type1 | 038 | SPLC DCHK CBSY CCHK CMDT RQL2 L2GR ERR1 |
| 43 | | 11C | SPLC DCHK CBSY CCHK CMDT RQL2 L2GR L2CX IDLE |
| 44 | type2 | 1B8 | SPLC DCHK CBSY CCHK CMDT RQL2 L2GR L2CX |
| 45 | | 00E | SPLC DCHK CBSY CCHK CMDT RQL2 L2GR L2CX L2DX IDLE |
| 46 | type2 | 39C | SPLC DCHK CBSY CCHK CMDT RQL2 L2GR L2CX L2DX |
| 47 | type1 | 04E | SPLC DCHK CBSY CCHK CMDT RQL2 L2GR L2CX L2DX ERR1 |
| 48 | type1 | 15C | SPLC DCHK CBSY CCHK CMDT RQL2 L2GR L2CX ERR1 |
| 49 | | 0BC | SPLC DCHK CBSY CCHK CMDT RQL2 L2GR L2DX IDLE |
| 50 | type2 | 2F8 | SPLC DCHK CBSY CCHK CMDT RQL2 L2GR L2DX |
| 51 | type1 | 0FC | SPLC DCHK CBSY CCHK CMDT RQL2 L2GR L2DX ERR1 |
| 52 | type1 | 031 | SPLC DCHK CBSY CCHK CMDT RQL2 ERR1 |
| 53 | | 083 | SPLC DCHK CBSY CCHK RQL2 IDLE |
| 54 | type2 | 286 | SPLC DCHK CBSY CCHK RQL2 |
| 55 | | 201 | SPLC DCHK CBSY CCHK RQL2 L2GR IDLE |
| 56 | type2 | 383 | SPLC DCHK CBSY CCHK RQL2 L2GR |
| 57 | type1 | 241 | SPLC DCHK CBSY CCHK RQL2 L2GR ERR1 |
| 58 | | 220 | SPLC DCHK CBSY CCHK RQL2 L2GR L2CX IDLE |
| 59 | type2 | 3C1 | SPLC DCHK CBSY CCHK RQL2 L2GR L2CX |
| 60 | | 190 | SPLC DCHK CBSY CCHK RQL2 L2GR L2CX L2DX IDLE |
| 61 | type2 | 0A0 | SPLC DCHK CBSY CCHK RQL2 L2GR L2CX L2DX |
| 62 | type1 | 1D0 | SPLC DCHK CBSY CCHK RQL2 L2GR L2CX L2DX ERR1 |
| 63 | type1 | 260 | SPLC DCHK CBSY CCHK RQL2 L2GR L2CX ERR1 |
| 64 | | 380 | SPLC DCHK CBSY CCHK RQL2 L2GR L2DX IDLE |
| 65 | type2 | 081 | SPLC DCHK CBSY CCHK RQL2 L2GR L2DX |
| 66 | type1 | 3C0 | SPLC DCHK CBSY CCHK RQL2 L2GR L2DX ERR1 |
| 67 | type1 | 0C3 | SPLC DCHK CBSY CCHK RQL2 ERR1 |
| 68 | | 1C6 | SPLC DCHK CBSY CMDT IDLE |
| 69 | type2 | 00D | SPLC DCHK CBSY CMDT |
| 70 | type1 | 186 | SPLC DCHK CBSY CMDT ERR1 |
| 71 | | 183 | SPLC DCHK CBSY CMDT REQS IDLE |
| 72 | type2 | 086 | SPLC DCHK CBSY CMDT REQS |
| 73 | type1 | 1C3 | SPLC DCHK CBSY CMDT REQS ERR1 |
| 74 | | 061 | SPLC DCHK CBSY CMDT REQS RQL2 IDLE |
| 75 | type2 | 343 | SPLC DCHK CBSY CMDT REQS RQL2 |
| 76 | | 070 | SPLC DCHK CBSY CMDT REQS RQL2 L2GR IDLE |
| 77 | type2 | 361 | SPLC DCHK CBSY CMDT REQS RQL2 L2GR |
| 78 | type1 | 030 | SPLC DCHK CBSY CMDT REQS RQL2 L2GR ERR1 |
| 79 | | 118 | SPLC DCHK CBSY CMDT REQS RQL2 L2GR L2CX IDLE |
| 80 | type2 | 1B0 | SPLC DCHK CBSY CMDT REQS RQL2 L2GR L2CX |
| 81 | | 00C | SPLC DCHK CBSY CMDT REQS RQL2 L2GR L2CX L2DX IDLE |
| 82 | type2 | 398 | SPLC DCHK CBSY CMDT REQS RQL2 L2GR L2CX L2DX |
| 83 | type1 | 04C | SPLC DCHK CBSY CMDT REQS RQL2 L2GR L2CX L2DX ERR1 |

FIG. 7B

| seq # | error type | MISR value | state sequence |
|---|---|---|---|
| 84 | type1 | 158 | SPLC DCHK CBSY CMDT REQS RQL2 L2GR L2CX ERR1 |
| 85 | | 0B8 | SPLC DCHK CBSY CMDT REQS RQL2 L2GR L2DX IDLE |
| 86 | type2 | 2F0 | SPLC DCHK CBSY CMDT REQS RQL2 L2GR L2DX |
| 87 | type1 | 0F8 | SPLC DCHK CBSY CMDT REQS RQL2 L2GR L2DX ERR1 |
| 88 | type1 | 021 | SPLC DCHK CBSY CMDT REQS RQL2 ERR1 |
| 89 | | 243 | SPLC DCHK CBSY CMDT RQL2 IDLE |
| 90 | type2 | 306 | SPLC DCHK CBSY CMDT RQL2 |
| 91 | | 161 | SPLC DCHK CBSY CMDT RQL2 L2GR IDLE |
| 92 | type2 | 143 | SPLC DCHK CBSY CMDT RQL2 L2GR |
| 93 | type1 | 121 | SPLC DCHK CBSY CMDT RQL2 L2GR ERR1 |
| 94 | | 390 | SPLC DCHK CBSY CMDT RQL2 L2GR L2CX IDLE |
| 95 | type2 | 0A1 | SPLC DCHK CBSY CMDT RQL2 L2GR L2CX |
| 96 | | 348 | SPLC DCHK CBSY CMDT RQL2 L2GR L2CX L2DX IDLE |
| 97 | type2 | 110 | SPLC DCHK CBSY CMDT RQL2 L2GR L2CX L2DX |
| 98 | type1 | 308 | SPLC DCHK CBSY CMDT RQL2 L2GR L2CX L2DX ERR1 |
| 99 | type1 | 3D0 | SPLC DCHK CBSY CMDT RQL2 L2GR L2CX ERR1 |
| 100 | | 230 | SPLC DCHK CBSY CMDT RQL2 L2GR L2DX IDLE |
| 101 | type2 | 3E1 | SPLC DCHK CBSY CMDT RQL2 L2GR L2DX |
| 102 | type1 | 270 | SPLC DCHK CBSY CMDT RQL2 L2GR L2DX ERR1 |
| 103 | type1 | 203 | SPLC DCHK CBSY CMDT RQL2 ERR1 |
| 104 | | 23A | SPLC CBSY IDLE |
| 105 | type2 | 3F5 | SPLC CBSY |
| 106 | type1 | 27A | SPLC CBSY ERR1 |
| 107 | | 11D | SPLC CBSY CCHK IDLE |
| 108 | type2 | 1BA | SPLC CBSY CCHK |
| 109 | type1 | 15D | SPLC CBSY CCHK ERR1 |
| 110 | | 30E | SPLC CBSY CCHK CMDT IDLE |
| 111 | type2 | 19D | SPLC CBSY CCHK CMDT |
| 112 | type1 | 34E | SPLC CBSY CCHK CMDT ERR1 |
| 113 | | 2E7 | SPLC CBSY CCHK CMDT REQS IDLE |
| 114 | type2 | 24E | SPLC CBSY CCHK CMDT REQS |
| 115 | type1 | 2A7 | SPLC CBSY CCHK CMDT REQS ERR1 |
| 116 | | 1D3 | SPLC CBSY CCHK CMDT REQS RQL2 IDLE |
| 117 | type2 | 027 | SPLC CBSY CCHK CMDT REQS RQL2 |
| 118 | | 2A9 | SPLC CBSY CCHK CMDT REQS RQL2 L2GR IDLE |
| 119 | type2 | 2D3 | SPLC CBSY CCHK CMDT REQS RQL2 L2GR |
| 120 | type1 | 2E9 | SPLC CBSY CCHK CMDT REQS RQL2 L2GR ERR1 |
| 121 | | 074 | SPLC CBSY CCHK CMDT REQS RQL2 L2GR L2CX IDLE |
| 122 | type2 | 369 | SPLC CBSY CCHK CMDT REQS RQL2 L2GR L2CX |
| 123 | | 0BA | SPLC CBSY CCHK CMDT REQS RQL2 L2GR L2CX L2DX IDLE |
| 124 | type2 | 2F4 | SPLC CBSY CCHK CMDT REQS RQL2 L2GR L2CX L2DX |
| 125 | type1 | 0FA | SPLC CBSY CCHK CMDT REQS RQL2 L2GR L2CX L2DX ERR1 |

FIG. 7C

| seq # | error type | MISR value | state sequence |
|---|---|---|---|
| 126 | type1 | 034 | SPLC CBSY CCHK CMDT REQS RQL2 L2GR L2CX ERR1 |
| 127 |  | 1D4 | SPLC CBSY CCHK CMDT REQS RQL2 L2GR L2DX IDLE |
| 128 | type2 | 029 | SPLC CBSY CCHK CMDT REQS RQL2 L2GR L2DX |
| 129 | type1 | 194 | SPLC CBSY CCHK CMDT REQS RQL2 L2GR L2DX ERR1 |
| 130 | type1 | 193 | SPLC CBSY CCHK CMDT REQS RQL2 ERR1 |
| 131 |  | 127 | SPLC CBSY CCHK CMDT RQL2 IDLE |
| 132 | type2 | 1CE | SPLC CBSY CCHK CMDT RQL2 |
| 133 |  | 0D3 | SPLC CBSY CCHK CMDT RQL2 L2GR IDLE |
| 134 | type2 | 227 | SPLC CBSY CCHK CMDT RQL2 L2GR |
| 135 | type1 | 093 | SPLC CBSY CCHK CMDT RQL2 L2GR ERR1 |
| 136 |  | 149 | SPLC CBSY CCHK CMDT RQL2 L2GR L2CX IDLE |
| 137 | type2 | 113 | SPLC CBSY CCHK CMDT RQL2 L2GR L2CX |
| 138 |  | 224 | SPLC CBSY CCHK CMDT RQL2 L2GR L2CX L2DX IDLE |
| 139 | type2 | 3C9 | SPLC CBSY CCHK CMDT RQL2 L2GR L2CX L2DX |
| 140 | type1 | 264 | SPLC CBSY CCHK CMDT RQL2 L2GR L2CX L2DX ERR1 |
| 141 | type1 | 109 | SPLC CBSY CCHK CMDT RQL2 L2GR L2CX ERR1 |
| 142 |  | 0E9 | SPLC CBSY CCHK CMDT RQL2 L2GR L2DX IDLE |
| 143 | type2 | 253 | SPLC CBSY CCHK CMDT RQL2 L2GR L2DX |
| 144 | type1 | 0A9 | SPLC CBSY CCHK CMDT RQL2 L2GR L2DX ERR1 |
| 145 | type1 | 167 | SPLC CBSY CCHK CMDT RQL2 ERR1 |
| 146 |  | 22E | SPLC CBSY CCHK RQL2 IDLE |
| 147 | type2 | 3DD | SPLC CBSY CCHK RQL2 |
| 148 |  | 357 | SPLC CBSY CCHK RQL2 L2GR IDLE |
| 149 | type2 | 12E | SPLC CBSY CCHK RQL2 L2GR |
| 150 | type1 | 317 | SPLC CBSY CCHK RQL2 L2GR ERR1 |
| 151 |  | 28B | SPLC CBSY CCHK RQL2 L2GR L2CX IDLE |
| 152 | type2 | 297 | SPLC CBSY CCHK RQL2 L2GR L2CX |
| 153 |  | 1C5 | SPLC CBSY CCHK RQL2 L2GR L2CX L2DX IDLE |
| 154 | type2 | 00B | SPLC CBSY CCHK RQL2 L2GR L2CX L2DX |
| 155 | type1 | 185 | SPLC CBSY CCHK RQL2 L2GR L2CX L2DX ERR1 |
| 156 | type1 | 2CB | SPLC CBSY CCHK RQL2 L2GR L2CX ERR1 |
| 157 |  | 32B | SPLC CBSY CCHK RQL2 L2GR L2DX IDLE |
| 158 | type2 | 1D7 | SPLC CBSY CCHK RQL2 L2GR L2DX |
| 159 | type1 | 36B | SPLC CBSY CCHK RQL2 L2GR L2DX ERR1 |
| 160 | type1 | 26E | SPLC CBSY CCHK RQL2 ERR1 |
| 161 |  | 09D | SPLC CBSY CMDT IDLE |
| 162 | type2 | 2BA | SPLC CBSY CMDT |
| 163 | type1 | 0DD | SPLC CBSY CMDT ERR1 |
| 164 |  | 32E | SPLC CBSY CMDT REQS IDLE |
| 165 | type2 | 1DD | SPLC CBSY CMDT REQS |
| 166 | type1 | 36E | SPLC CBSY CMDT REQS ERR1 |
| 167 |  | 137 | SPLC CBSY CMDT REQS RQL2 IDLE |

FIG. 7D

| seq # | error type | MISR value | state sequence |
|---|---|---|---|
| 168 | type2 | 1EE | SPLC CBSY CMDT REQS RQL2 |
| 169 | | 0DB | SPLC CBSY CMDT REQS RQL2 L2GR IDLE |
| 170 | type2 | 237 | SPLC CBSY CMDT REQS RQL2 L2GR |
| 171 | type1 | 09B | SPLC CBSY CMDT REQS RQL2 L2GR ERR1 |
| 172 | | 14D | SPLC CBSY CMDT REQS RQL2 L2GR L2CX IDLE |
| 173 | type2 | 11B | SPLC CBSY CMDT REQS RQL2 L2GR L2CX |
| 174 | | 226 | SPLC CBSY CMDT REQS RQL2 L2GR L2CX L2DX IDLE |
| 175 | type2 | 3CD | SPLC CBSY CMDT REQS RQL2 L2GR L2CX L2DX |
| 176 | type1 | 266 | SPLC CBSY CMDT REQS RQL2 L2GR L2CX L2DX ERR1 |
| 177 | type1 | 10D | SPLC CBSY CMDT REQS RQL2 L2GR L2CX ERR1 |
| 178 | | 0ED | SPLC CBSY CMDT REQS RQL2 L2GR L2DX IDLE |
| 179 | type2 | 25B | SPLC CBSY CMDT REQS RQL2 L2GR L2DX |
| 180 | type1 | 0AD | SPLC CBSY CMDT REQS RQL2 L2GR L2DX ERR1 |
| 181 | type1 | 177 | SPLC CBSY CMDT REQS RQL2 ERR1 |
| 182 | | 0EE | SPLC CBSY CMDT RQL2 IDLE |
| 183 | type2 | 25D | SPLC CBSY CMDT RQL2 |
| 184 | | 037 | SPLC CBSY CMDT RQL2 L2GR IDLE |
| 185 | type2 | 3EE | SPLC CBSY CMDT RQL2 L2GR |
| 186 | type1 | 077 | SPLC CBSY CMDT RQL2 L2GR ERR1 |
| 187 | | 33B | SPLC CBSY CMDT RQL2 L2GR L2CX IDLE |
| 188 | type2 | 1F7 | SPLC CBSY CMDT RQL2 L2GR L2CX |
| 189 | | 31D | SPLC CBSY CMDT RQL2 L2GR L2CX L2DX IDLE |
| 190 | type2 | 1BB | SPLC CBSY CMDT RQL2 L2GR L2CX L2DX |
| 191 | type1 | 35D | SPLC CBSY CMDT RQL2 L2GR L2CX L2DX ERR1 |
| 192 | type1 | 37B | SPLC CBSY CMDT RQL2 L2GR L2CX ERR1 |
| 193 | | 29B | SPLC CBSY CMDT RQL2 L2GR L2DX IDLE |
| 194 | type2 | 2B7 | SPLC CBSY CMDT RQL2 L2GR L2DX |
| 195 | type1 | 2DB | SPLC CBSY CMDT RQL2 L2GR L2DX ERR1 |
| 196 | type1 | 0AE | SPLC CBSY CMDT RQL2 ERR1 |
| 197 | type1 | 12A | ERR1 |

FIG. 7E

OPERATION GRAPH BASED EVENT MONITORING SYSTEM

This patent application is a continuation-in-part of patent application Ser. No. 09/238,293, filed Jan. 28, 1999.

BACKGROUND OF THE INVENTION

1. Field of the Invention

The present invention relates generally to hardware of computer systems, and more particularly pertains to a method and system for tracing system operations of a computer system.

The present invention provides a non-obtrusive activity monitor for advantageously monitoring disjunct, concurrent computer operations in a heavily queued computer system. For each active computer operation, the activity monitor uses a hardware implementation of an event-triggered operation graph-monitoring device to trace the path of the computer operation through the computer system. For each operation, a unique signature is generated that records the actual path of the operation and significantly reduces the amount of trace data to be stored. In a preferred embodiment, the trace information is stored together with a time stamp for debugging and measuring queuing effects and timing behavior in the computer system.

2. Discussion of the Prior Art

During the course of operating a computer system, many types of computer operations can occur, for example, pressing of an enter key on a keyboard, loading of data from a disk into memory, or the occurrence of severe errors or further trace events. There can be system internal events or events which are introduced into the system from an external site, by a user of the system, for example. These events form part of the operations of the computer system and encompass a broad variety of operations in a computer system, such as a data transfer from disk to RAM, status requests referring to any devices situated in the computer system, etc. During such an operation, either user data or control data initiated and evaluated by the system pass through one or a plurality of so-called "functional units", which can be regarded for the purposes of the present invention in abstract generality as elements of the computer system.

With the high integration of computer systems, it has become necessary to integrate hardware debugging functions into the system. During the hardware development phase, debugging is typically performed by simulation. However, after the hardware is available, error analysis is only possible with trace data that is generated by the hardware itself.

The state of the art in tracing generally comprises units that do a fixed selection of possible inputs which is a 'location centric approach'. E.g. in U.S. Pat. No. 5,355,484 tracing off-chip interfaces, tracing interfaces between functional units and tracing by copying commands and data to arrays are the tools and methods used.

This location centric approach is, however, limited in its practical value because such methods are characterized by the facts that the sequence of operations can be analyzed only with a short history due to trace array limitations; further, the view of a trace is limited to a specific functional unit, i.e., a so-called "isolated view" limits the overall analysis, and finally, tracing is totally independent of error checking.

Today's systems, however, involve many queues and buffers in the data flow, to allow multiple operations to be active at a time. The control logic of this data flow is much more complex, making debugging of the behavior of such a system very difficult. E.g., a concrete example of a chip design can have the complexity of a maximum of 24 outstanding operations at the same time.

To be able to monitor and analyze the behavior of such a computer system, location centric monitoring as it is above is no longer sufficient because the complexity involved by the concurrent running of a plurality of operations hinders the analyzing user of the tracing system from gaining an overall analytical view of the system.

SUMMARY OF THE INVENTION

Thus, an object of the present invention is to provide efficient tracing of computer system operations in a computer system where a large variety of computer system operations is concurrently processed in a variety of system queues and buffers in the data flow.

Those operations are split into subtasks and a functional unit (FU) typically performs each subtask. The subtask execution is ordered (e.g. subtask i must be executed before subtask j) and in the ideal case there is only a single path through a particular subtask sequence. In reality there are many reasons why two operations of the same type do not execute in exactly the same way. For example resources may not be available and therefore in one case an operation subtask execution may be suspended. Or if there are multiple instances of a functional unit available a subtask of one operation may execute on FU k and for another operation the corresponding subtask may execute on FU m. All this amounts to a certain amount of variability.

The important point is that the subtask execution is ordered and that the variability is finite. Therefore the subtask execution sequence of an operation could be represented by a graph and implemented as a finite state machine. The graph will be denoted from now on as an operation graph and the FSM as an OGFSM. The nodes in the operation graph typically correspond to functional units and the edges in the graph correspond to events generated by a functional unit.

For every operation there is an OGFSM assigned and the number of OGFSM instances in a computer system is determined by the maximum number of outstanding operations the chip supports. If a new operation starts it gets a unique Operation Identifier assigned and this Operation Identifier is associated with an OGFSM as well. A functional unit inspects the Operation Identifier and reports its events (corresponding to the edges in the operation graph) to the OGFSM addressed by the Operation Identifier. One can get a global view of the state of the computer system by inspecting the state registers of all OGFSM. This would show, for example, how many operations are active, which subtasks the active operations are currently executing on which functional unit (if there are multiple instances). In addition to the global view the OGFSM supports the capability to reduce the number of trace data entries. One example is that not every state transition of the OGFSM needs to generate a trace data entry. The OGFSM could be programmed such that only selected states or state transitions should cause a trace data entry. Adding a signature register to the OGFSM and encoding the states of the OGFSM such that every path through the OGFSM provides a unique signature allows a dramatic reduction in the number of trace data entries to be made.

The use of the signature makes it possible to make just one trace data entry for a complete operation, since from the signature the path of the operation through the computer system could be reconstructed.

This object is solved by the present invention which is directed to a method for tracing computer system operations (such as computer instructions being executed by the computer system) comprising the steps of storing computer system operation path relating information into a storage, the operation path comprising a description of a sequence of operation states characterized by assigning a unique operation identifier to each computer system operation to be traced, keeping said identifier constant during processing of the computer system operation by a plurality of functional units of the computer system, associating a computer system operation with a respective operation graph containing state control information for the plurality of functional units, and evaluating the contents of the storage to retrieve trace data information.

The present invention is further directed to a computer system comprising a means for storing computer system operation path relating information into a storage, the computer system operation path comprising a description of a sequence of computer system operation states, the system characterized by means for assigning a unique operation identifier to each computer system operation to be traced, means for keeping said identifier constant during processing of the computer system operation by a plurality of functional units of the computer system, means for associating a computer system operation with a respective operation graph containing state control information for the plurality of functional units, and means for evaluating the contents of the storage to retrieve trace data information.

A non-obtrusive activity monitor advantageously monitors disjunct, concurrent computer system operations in heavily queued computer systems. For each pending computer system operation, the monitor uses the hardware implementation of an event triggered operation graph to trace the path of the computer system operation through the computer system. For each followed path, a unique signature is generated that significantly reduces the amount of trace data to be stored. In a preferred embodiment of the inventive method and system, the trace information is stored together with a time stamp for debugging and measuring queuing effects and timing behavior in a computer system.

With the method and system according to the present invention, either one or a plurality of the following advantages are achieved:

Tracing can be combined with error tracking.

Time dependencies between different computer system operations can be made transparent to the user.

Tracing can be effected with a minimum amount of trace data.

The whole computer system or subsystem can be traced. The analyzing view is not limited anymore to chip boundaries or other hardware elements.

The whole course of computer system operation can be traced, which means that a monitoring of the control logic instead of monitoring the data flow is possible. Thus, analyzing and debugging is more comfortable, easier and quicker.

For concurrent computer system operations, the timing behavior can be traced, e.g. for analysis of overtakes, hangs, etc.

The operation graph is specified as a finite state machine with the possibility of real time error checking. Only one trace array is needed, and multiple arrays with redundant data are not required. Thus, the amount of data can be kept to a minimum.

The unique operation ID allows a trace of the course of a computer system operation even over chip boundaries and finally, the amount of data to be stored in a trace array is minimized by the generation of unambiguous, i.e. unique signatures for each possible course of an operation.

The present invention can monitor the state of all active traced operations all of the time, and store in a storage device such as a memory the state of all active operations. So the present invention can read the data contained in storage and know the state of all operations at any specific time.

The present invention provides state information which means, in terms of a graph with nodes and edges, the node at which an operation resides, and the sequence of edges the operation took to reach the node. The state information of the present invention is available for all active traced computer systems operations, and all computer systems operations which have been completed. For completed computer systems operations, the state information would be the sequence of edges the computer systems operation traversed from start through completion.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
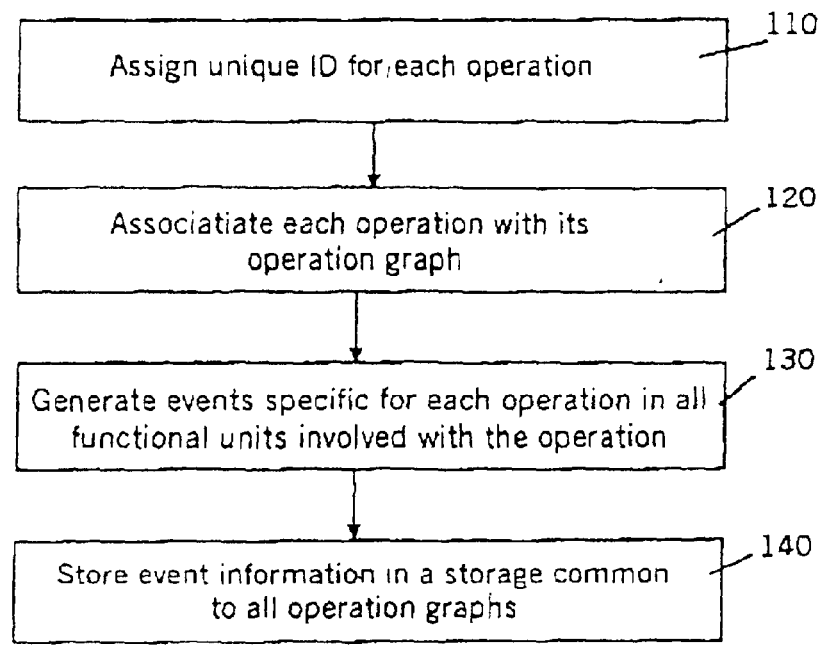
FIG. 1 is a block diagram showing the essential steps of a preferred embodiment of the method according to the present invention.

The following is a very high level summary and discussion of present invention relative to the current state of the art in tracing.

The state-of-the art in tracing involves a three stage process:

1. Observation
2. Reduction
3. Storing the reduced information

Steps 1 and 3 are generally trivial, the critical step being the reduction step.

An essential point is that the trace stores redundant information. The information is redundant in the sense that if the states of all of the latches are stored in every cycle in an ideal trace, then the information in the real trace would be a just a subset of the information in the ideal trace.

The present invention provides an operation graph associated with each traced computer operation which is not available even with an ideal trace. The operation graph is a language recognizer which recognizes the set of legal subtask execution sequences associated with each traced computer operation. In other words, the operation graph is a specification of all of the legal subtask execution sequences associated with each traced computer operation. This is a first and very important step which creates new, nonredundant information (a specification is orthogonal to an implementation and therefore has additional information).

The prior art acknowledges that language recognizers can be used for specification purposes. The present invention is novel in the use of language recognizers in the tracing process and the advantages achieved thereby.

The basic problem in the reduction step (step 2 above) is that it is extremely difficult to select the right set of signals to be stored in each trace. With too many signals, the trace overflows. With too few signals, then the information stored is useless because you can't derive any context.

The concept of an operation graph associated with each traced computer operation allows coverage of a very wide spectrum of both very coarse grained tracing and very fine grained tracing. And this can be done even concurrently.

The following is an elaboration on coarse-grained tracing and fine-grained tracing. The distinction is based upon the number of trace entries made to the computer's storage per operation traced. The coarser the grain, the fewer trace entries per operation. Time stamps may be recorded only when a trace entry is made, so the coarser the grain, the less time information is recorded for an operation. This is a tradeoff between the amount of information stored about the operation, and the space in storage required to store it.

Coarse Grained Tracing

Coarse Grained tracing can generate a trace entry only if the operation graph returns to an initial state. This signature yields at least the actual path taken by the computer operation through the operation graph. However, it is difficult to extract a timing relationship of the concurrency of subtask executions of different computer operations. However, it yields an excellent overview of all the computer operations which have been active and their subtask execution sequences over a long period of time. Only the signature and the time stamp associated with the operation's completion would be stored.

Another coarse-grained tracing setup can generate a trace entry if the operation graph leaves an initial state and then returns to the initial state. In a tracing system with a timestamp we get the following information: the time the operation started (first trace entry), the time the operation finished (second trace entry for that operation) and the path the operation took (from the signature saved). Even so the exact time is not known at which a subtask was executed. Reasonable upper and lower bounds could be derived if the path taken and the minimum execution times of the functional units are taken into account.

Fine Grained Tracing

Fine-grained tracing can generate a trace entry, and also a timestamp, every time an operation graph has a state transition. This yields the timing relationship between the subtask execution of different operations.

Coarse and Fine Grained Tracing Simultaneously

Coarse and fine grained tracing simultaneously starts with coarse grain tracing activated in each OGFSM. When an operation of interest is detected (e.g. an Interrupt operation) then the corresponding OGFSM switches to fine-grained tracing. All other OGFSM still continue with coarse-grained tracing. At the end of the operation of interest, the corresponding OGFSM switches to coarse grain tracing again. This combination of coarse and fine grained tracing provides a detailed picture of an operation of interest and still yields the context and timing relationship of other concurrent operations, while minimizing the number of trace entries.

The concept of an operation graph associated with each traced computer operation of the present invention adds specification information to the system, which allows a dramatically improved reduction process (step 2) without losing too much information.

The operation graph of the present invention provides information on when to stop a trace because it's a language recognizer, and the trace is stopped if one of the operation graphs detects a specification violation. This avoids the production of useless trace information which is produced because the trace is stopped much too late.

Assigning a unique operation identifier to an operation is not new and is well known in packet switching networks (in which a sequence number is typically used).

Language recognizers per se are also not new, and typically are used in the context of finite state machines. However, for today's real world finite state machine language recognizers, the effort would be prohibitive. The present invention applies language recognizers to subtask execution paths, not to the state traversal path within a single finite state machine. This tremendously reduces the effort and at the same time allows for the implementation of a novel idea, the tracing of concurrent finite state machine execution.

With reference to the figures and with special reference now to FIG. 1 a preferred embodiment of the method according to the present invention is summarized as follows: In a first step 110 a unique ID is assigned for each traced computer system operation. This identifier can be a number which is sufficiently long in order to identify uniquely all computer system operations which are to be traced and concurrently monitored. The IDs will be reused after the respective operation has retired or after a restart of the computer system.

Next, in step 120 each computer system operation is associated with its own operation graph. All operation graphs are processes managed by the computer system, and are able to receive inputs from each functional unit concerned during the course of the operation and to write trace information to a trace unit which collects the trace data. As any computer system operation is typically composed of several subtasks and the subtasks are executed sequentially, the sequence of the subtasks can be represented as a directed graph which is here called an "operation graph". Any subtask performed by any functional unit generates an event which is specific for each computer system operation and which is specific for each functional unit involved with the course of the operation. This event generation is performed in step 130. Generally, the operation graph controls the completion of the subtasks of each computer system operation, it knows which states each computer system operation is allowed to be in and finally the computer system operation graph includes all control information specific for each functional unit, e. g. it knows that an event number 3 must not occur before an event number 2 has occurred. Such rules, referred to in the following description as "expert knowledge" have to be included in the programming of the operation graph. Finally, any event information processed by the operation graphs is stored in a storage common to all operation graphs. This storage can advantageously be a so called trace data array. This event information data holds information about the completion of a subtask or a task and information about subtasks which were not successful in the respective functional unit. Thus, a list of possible errors and possible events is included in said event information data.

Figure 2:
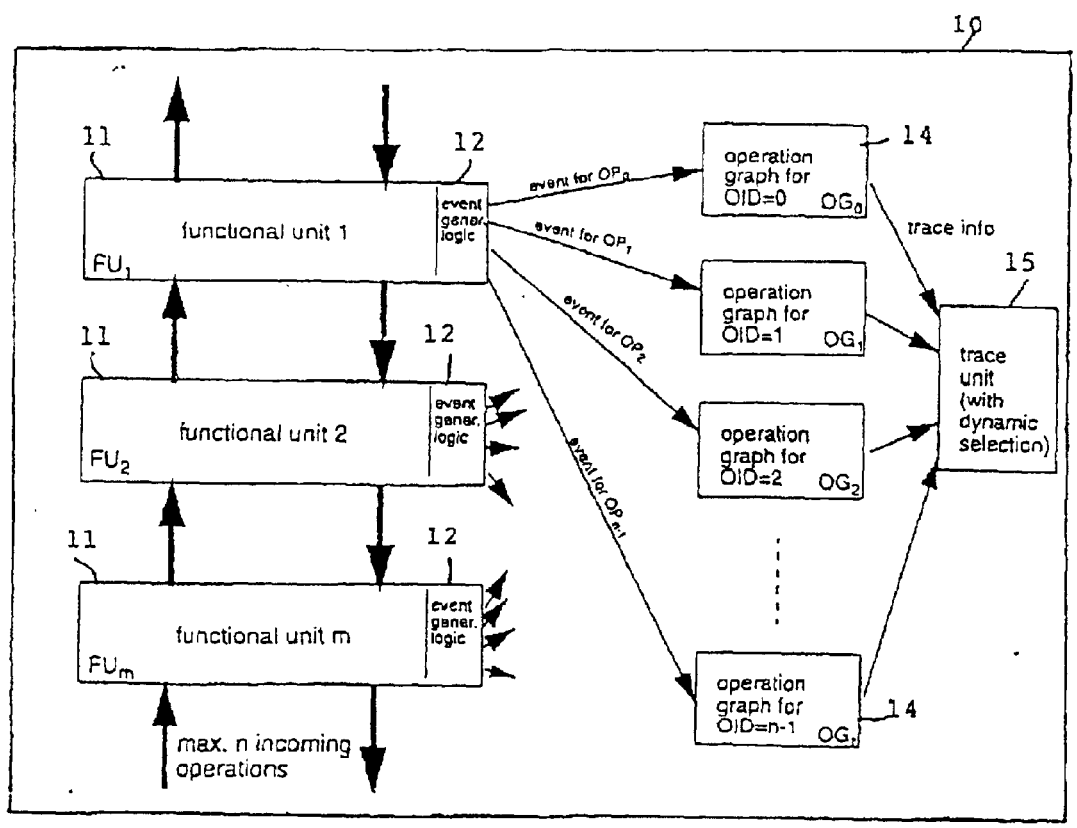
FIG. 2 is a schematic representation of the control and data flow during the method according to the present invention.

With reference now to FIG. 2 the control and data flow of the method described above is as follows:

A computer system 10 is considered which allows up to n independent computer system operations. As mentioned above each computer system operation has its operation identifier OID, indexed by r, r=(0 . . . n−1). Those computer system operations can be handled concurrently by the computer system. Further, the computer system 10 which is to be traced has a number m of functional units 11, $FU_P$, p=(1 . . . m). In each functional unit there is a so-called event generation logic 12 that reports the completion of a subtask Tv, n=(1 . . . s) of an operation $OP_r$ to an operation graph 14, abbreviated by $OG_r$. It should be noted that every operation has its dedicated operation graph, e.g. $FU_1$ reports an event "$T_1$ completed for OID=2" to $OG_2$.

As can be seen from the drawing the event information data, e.g. "$T_1$ completed for 0ID=2" is processed by the respective operation graph $OG_0$, . . . $OG_r$ and the respective output is delivered to a trace unit 15 from where it can be accessed selectively by a user whose task consists in analyzing this trace data information.

The operation graph 14 is implemented as an operation graph finite state machine (OGFSM). With the help of the OGFSM the hardware of the computer system is surveyed. It is a hardware description language summarizing in tables an actual state of a computer system operation which is transferred to a second, succeeding state, when an input vector is applied to the OGFSM. All states are stored in a register. If an unexpected event occurs, which is put into the OGFSM, the OGFSM passes into an error state and an error message is signalized.

Figure 3:
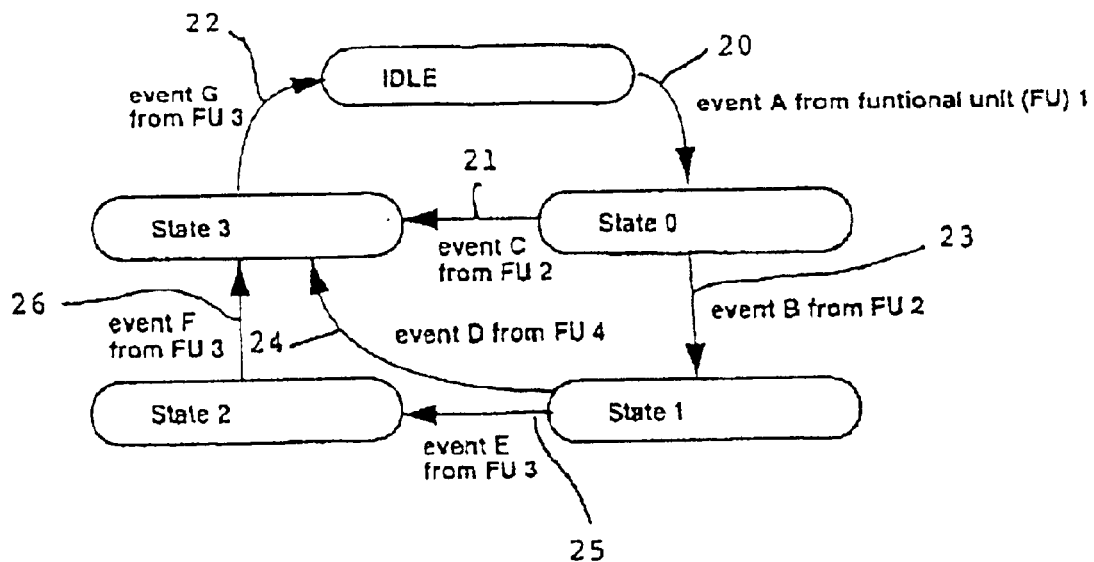
FIG. 3 is a schematic representation of an Operation Graph Finite State Machine (OGFSM) according to the present invention.

With reference now to FIG. 3 the implementation of the operation graph is described as follows:

Generally, a computer system operation is typically composed of several subtasks and the subtasks are executed sequentially. Therefore, the sequence can be represented as a directed graph, or operation graph, that can be specified and realized as a finite state machine FSM.

It should be noted, that one single operation graph may describe the behavior of different types of operations. For each type of operation, a sequence of events can be defined that corresponds to the completion or initiation of a subtask.

The operation graph shown in FIG. 3 allows the monitoring of three different types of operation:

The sequence "IDLE ↑State 0 ↑State 3 ↑IDLE" along the arcs 20, 21, 22 corresponds to an operation type 1 with the subtasks "event A from FU 1", "event C from FU 2", "event G from FU 3".

Further, the sequence "IDLE ↑State 0 ↑State 1 ↑State 3 ↑IDLE" along the arcs 20, 23, 24, 22 corresponds to an operation type 2 with the subtasks "event A from FU 1", "event B from FU 2". "event D from FU 4", "event G from FU 3".

The sequence "IDLE ↑State 0 ↑State 1 ↑State 2 ↑State 3 ↑IDLE" along the arcs 20, 23, 25. 26. 22 corresponds to an operation type 3 with the subtasks "event A from EU 1", "event B from FU 2", "event E from FU 3", "event F from FU 3", "event G from FU 3".

With the method and system described above an implicit error checking can be advantageously performed.

For the different operation types, only a subset of all possible events are allowed. E.g. with reference to FIG. 3 for operation type 1 the events B, D, E and F are not allowed. For a specific operation type an event is only allowed in one specific state.

The Operation Graph State Machine is designed in a way that every illegal event causes the state machine to branch to an error state. Error indications can look like:

Operation type 1 is in state 0, but event G occurs before event C.

For operation type 2 there is an event F, but an operation type 2 is not expected to reach state 2.

Event B occurred twice for operation type 3 during the time when IDLE was left until the time when IDLE was reached.

With special reference now to FIG. 4 a further, powerful feature of the present invention is described next below.

For the detection of interference problems, the trace unit 15 is switched to a mode in which every state change—instead of registering states themselves—in one of the operation graph state machines generates an entry in a trace array. Each entry is marked with a time stamp that allows a measurement of the temporal dependencies between the subtasks T of several operations dependent from time t. The entries in the trace array can then contain the following information:

OGFSM for operation 3 in state 3 at time t,

OGFSM for operation 1 in state 0 at time t+5 cycles,

OGFSM for operation 3 in state IDLE at time t+6 cycles, and so on . . .

Figure 4:
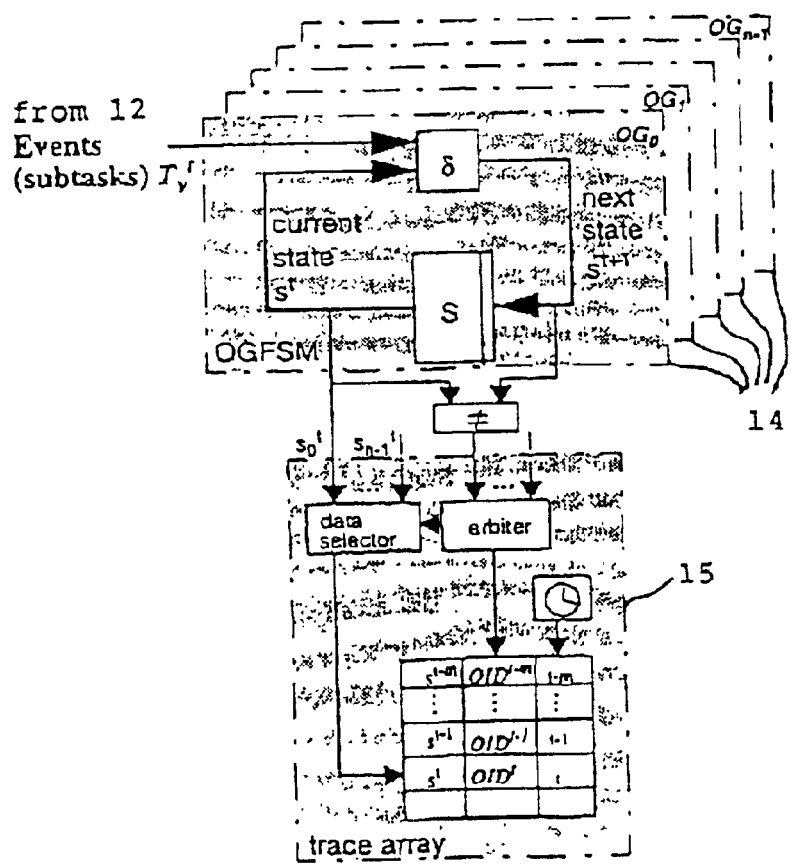
FIG. 4 is a schematic representation showing the control and data flow the OGFSMs are dealing with during the method of the present invention.

When the entries in the trace data array 15 are ordered by time, as it is depicted in the bottom part of FIG. 4, the temporal dependencies between the subtasks T and thus the reasons for a subtask miscompletion can be determined by an overall analysis and view of the trace data array 15.

Figure 5:
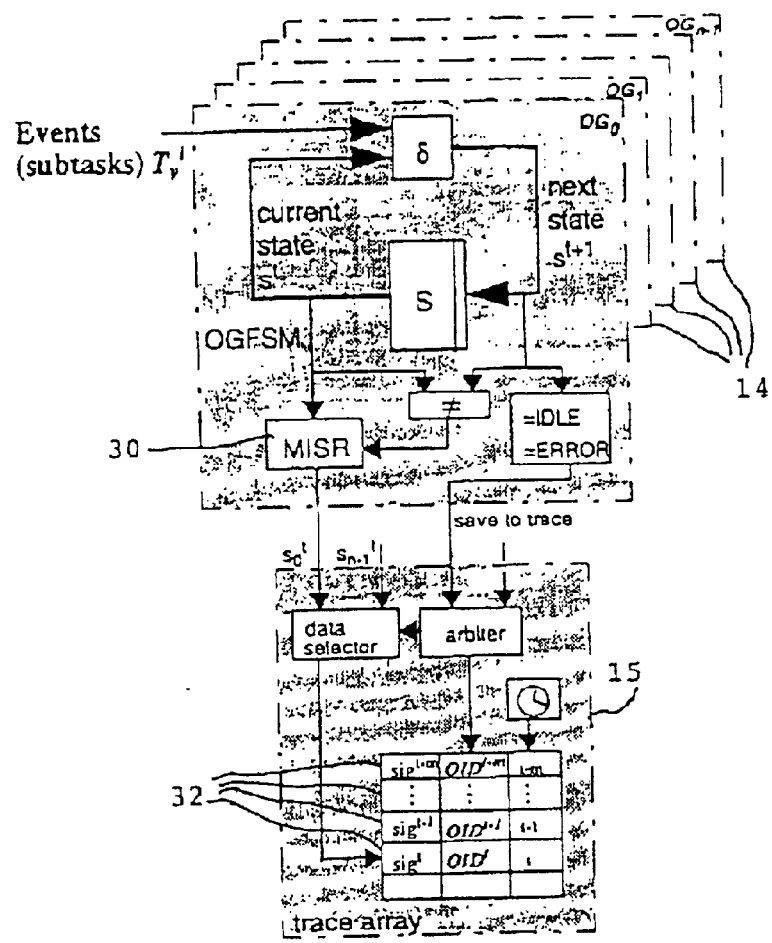
FIG. 5 is a schematic representation of a modified, preferred embodiment of the method and system of the present invention which includes data compression of the trace data.

With reference now to FIG. 5 which corresponds to FIG. 4 in its basic structure and reference signs, a further advantageous feature of the method and system according to the present invention is described by which trace data is compressed in order to minimize the cost for additional hardware for buffering and storing of the trace data.

For achieving this, the number of trace data entries has to be kept as low as possible. A first step to reduce the number of entries has already been described in conjunction with FIG. 4, by recording only state changes in the OGFSMs.

For a further reduction, the monitoring system can be used in a mode where a data compression mechanism is used. In this mode, only one entry is generated for each operation. More detailed information about the operation can be derived later on from the trace entry itself that advantageously contains the complete path the operation went through in a compressed format.

Thus, to each OGFSM, a Multiple Input Signature Register 30 (MISR) is added that generates a signature 32 from the state codes $s^t$ by polynomial division.

The signature 32 is saved to the trace array 15 under the following rules:

1. The MISR is initialized when the OGFSM is in the IDLE state.
2. The MISR is updated with every state change in the OGFSM.
3. A branch back to IDLE causes a "save to trace array".
4. A branch to the error state causes a "save to trace array".

Signature monitoring schemes for FSMs are mainly used to detect permanent and transient faults that lead to sequencing errors. To achieve this, the signatures obtained by polynomial division of the state codes with the selected polynomial normally have to be identical after all states having the same successor.

The present invention uses the opposite approach for generating the signature:

The state assignment for the OGFSM and the polynomial is chosen in a way such that each existing sequence starting from the IDLE state has its own unambiguous signature. If loops are avoided within these sequences, a finite number of possible signatures exist that describe exactly the path the OGFSM went through.

Figure 7:
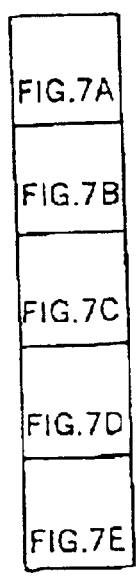
FIG. 7 is a table showing possible state sequences and their MISR values involved in the method according to the present invention.
Figure 6:
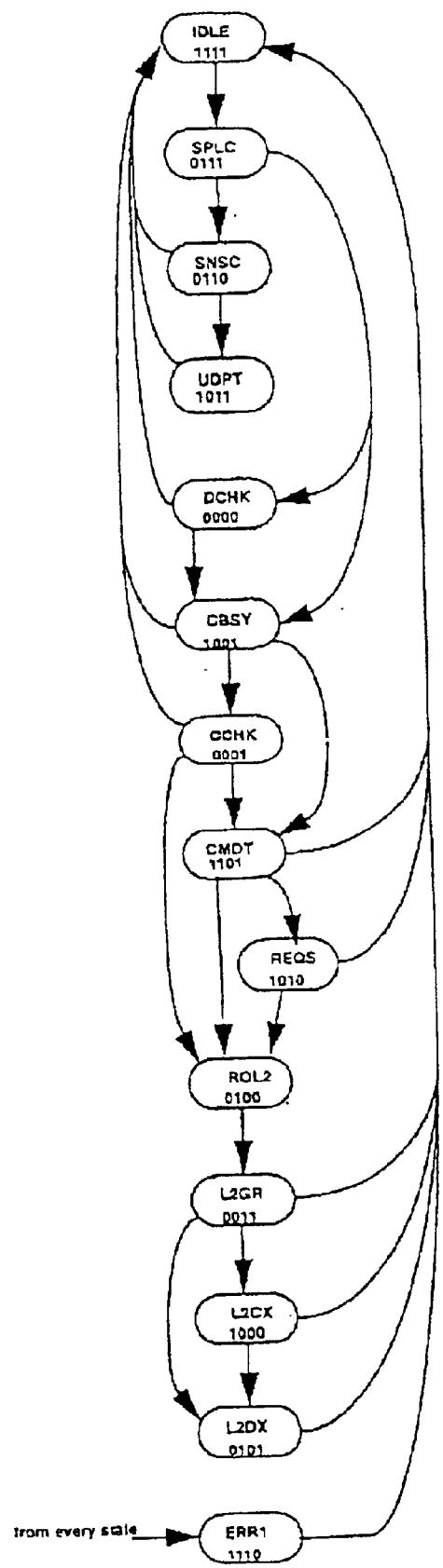
FIG. 6 shows a schematic representation of the control flow within an OGFSM.

With reference now to FIG. 6 and the table of FIG. 7 the different state sequences with the respective unique signatures are shown to illustrate this procedure.

The OGFSM shown in FIG. 6 consists of an IDLE state, 13 event states SPLC, SNSC, UPDT, DCKH, CBSY, CCHK, CMDT, REQS, RQL2, L2GR, L2CX, L2DX, and the error state ERR1.

Assume now two types of errors:

One error that forces the OGFSM into the error state, type 1, and another error that just causes the operation monitoring system to record the signature of the OGFSM state in which the error occurred, type 2. This leads to 197 possible sequences through the OGFSM as shown in the table of FIG. 7.

If we choose the 4 bit OGFSM state encoding shown in FIG. 7 and divide the state value by using a MISR with a polynomial $1+x^3+x^{10}$, the 197 unambiguous signatures.

From the foregoing description, a system in which the method of the present invention is implemented has the following advantages:

The whole system or subsystem can be traced. The analyzing view is not limited anymore to chip boundaries.

The whole course of an operation is traced, which means that a monitoring of the control logic instead of monitoring the data flow is possible.

For concurrent operations, the timing behavior can be traced, e.g. for analysis of overtakes, hangs, etc.

The operation graph is specified as a finite state machine with the possibility of real time error checking.

Only one trace array is needed, multiple arrays with redundant data are not required. Thus, the amount of data can be kept to a minimum.

The unique operation ID allows a trace of the course of a computer system operation even over chip boundaries and finally, the amount of data to be stored in a trace array is minimized by the generation of unambiguous, unique signatures for each possible course of a computer system operation.

The method and system of the present invention can be used in a wide area of applications that use multiple queues for the transport of concurrent operations.

Examples of such systems are computer I/O subsystems, field buses, ATM switches, OSI-based network and communication devices (routers, bridges, gateways, etc.) from layer 2 to 4.

While the invention has been particularly shown and described with respect to preferred embodiments thereof, it will be understood by those skilled in the art that the foregoing and other changes in form and details may be made therein without departing form the spirit and scope of the invention.

Having thus described the invention, what we claim as new, and desire to secure by Letters Patent is:

1. A method for tracing computer system operations of a computer system comprised of a plurality of functional units, comprising the steps of:

storing in a storage memory execution path information for each computer system operation including computer system operation graphs, each of which computer system operation graphs is a complete description of the sequence of operation states the computer system operation assumed during a traced computer system operation, assigning a unique operation identifier ID to each traced computer system operation, maintaining the unique operation identifier ID constant during processing of each traced computer system operation by the plurality of functional units of the computer system, associating each traced computer system operation with its own individual and dedicated, event-triggered, operation graph finite state machine which contains the complete specification of legal computer system operation state transitions, and which monitors the plurality of functional units to trace the path of that traced computer system operation through the computer system, each functional unit generating and reporting events for traced computer operations along with its associated operation identifier ID, for each traced computer system operation, storing in its own dedicated operation graph finite state machine and in storage memory, events generated and reported with each associated operation identifier ID by different functional units for that specific traced computer system operation, evaluating the contents stored in a dedicated operation graph finite state machine to retrieve trace data information for a traced computer system operation.

2. The method of claim 1, wherein each functional unit includes event generation logic for reporting events associated with traced computer operations in that functional unit.

3. The method of claim 1, wherein all of the operation graph finite state machines report to a common trace array in the storage memory which stores events from different functional units in each operation graph finite state machine, and the common trace array is selectively accessed to analyze trace data information.

4. The method of claim 1, including adding a time stamp to each entry in storage memory.

5. The method of claim 1, wherein a unique operation identifier ID is assigned to a traced computer operation until after the completion of the traced computer operation or after a restart of the computer system, and is then reassigned to another traced computer operation.

6. The method of claim 1, wherein each change of state in one of the operation graph finite state machines generates an entry in a trace array, and each entry is marked with a time stamp.

7. The method of claim 1, wherein each operation graph finite state machine is a specification of all legal subtask execution sequences and an illegal event causes an operation graph finite state machine to branch to an error state.

8. The method of claim 1, wherein all traced computer operations are monitored all of the time during operation of the computer system up until after completion of the traced computer operation or after a restart of the computer system.

9. The method according to claim 1, characterized by the steps of, using signatures for coding state sequence relating information of an operation with the help of register storage means and a polynomial, characterizing said sequence by an operation graph specified by a finite state machine.

10. The method according to claim 9, characterized by the steps of, forming the signature starting from an idle state of the operation, and associating the operation states for the operation graph finite state machine and the polynomial such that each existing state sequence starting from the idle state has a unique signature.

11. A computer readable medium on which computer readable instructions are stored for implementing the method according to claim 1.

12. A computer system comprised of a plurality of functional units, and comprising:

a storage memory for storing computer system operation path relating information including computer system operation graphs, each of which computer system operation graphs is a programmed description of a sequence of operation states of the computer system to perform a traced computer system operation, means for assigning a unique operation identifier ID to each traced computer operation which is maintained constant during processing of each traced computer system operation by the plurality of functional units of the computer system, means for associating each traced computer system operation with its own individual and dedicated, event-triggered, operation graph state machine which contains state control information of the plurality of functional units to trace the path of that traced computer system operation through the computer system, each functional unit generating and reporting events for traced computer operations along with its associated operation identifier ID, the storage memory storing, for each specific traced computer system operation, in its own individual dedicated operation graph finite state machine, events generated and reported with its associated operation identifier ID by different functional units for that traced computer system operation.

13. The system of claim 12, wherein each functional unit includes event generation logic for reporting events associated with traced computer operations in that functional unit.

14. The system of claim 12, wherein all of the operation graph finite state machines report to a common trace array in the storage memory which stores events from different functional units in each operation graph finite state machine, and the common trace array is selectively accessed to analyze trace data information.

15. The system of claim 12, including means for assigning a unique operation identifier ID to a traced computer operation until after the completion of the traced computer operation or after a restart of the computer system, and the unique operation identifier ID is then reassigned to another traced computer operation.

16. The system of claim 12, including means for generating an entry in a trace array for each change of state in one of the operation graph state machines, and each entry is marked with a time stamp.

17. The system of claim 12, wherein each operation graph finite state machine includes a summary in tables of a state of a traced computer operation which is transferred to a succeeding state, all states are stored in a register, and an illegal event causes an operation graph state machine to branch to an error state.

18. The system of claim 12, wherein the computer system monitors all traced computer operations all of the time during operation of the computer system up until after completion of the traced computer operation or after a restart of the computer system.

19. The system according to claim 12, characterized by, means for using signatures for coding state sequence relating information of an operation with the help of register storage means and a polynomial, means for characterizing said sequence by an operation graph specified by a finite state machine.

20. The system according to claim 19, characterized by, means for forming the signature starting from an idle state of the operation and means for associating the operation states for the operation graph finite state machine and the polynomial such that each existing state sequence starting from the idle state has a unique signature.

* * * * *

UNITED STATES PATENT AND TRADEMARK OFFICE
CERTIFICATE OF CORRECTION

PATENT NO.       : 6,874,105 B2                                        Page 1 of 1
APPLICATION NO.  : 09/997048
DATED            : March 29, 2005
INVENTOR(S)      : Thomas Buechner et al.

It is certified that error appears in the above-identified patent and that said Letters Patent is hereby corrected as shown below:

On The Title Page; Item
<u>Title Page (56)</u>

"References Citied should read"

-- US-6,467,052  10-2002  Kaler et al --
-- US-6,691,259  02-2004  Mackey et al --
-- US-6,240,549  05-2001  Hamada et al --
-- US-5,450,586  09-1995  Kuzara et al --
-- US-2003/0061600 A1  03-2003  Bates et al --

<u>Column 7, Line 28:</u>

"FU2." should read -- FU2, --

<u>Column 9, Line 28:</u>

"signatures." should read -- signatures are obtained. --

Signed and Sealed this

Twenty-ninth Day of May, 2007

JON W. DUDAS
*Director of the United States Patent and Trademark Office*